UNITED STATES PATENT OFFICE.

WALLACE APPLETON BEATTY, OF NEW YORK, N. Y., ASSIGNOR, BY DIRECT AND MESNE ASSIGNMENTS, OF ONE-FOURTH TO HORACE HERBERT SMITH, OF NEW YORK, N. Y., AND ONE-HALF TO VIVIAN M. FLEMING, OF FREDERICKSBURG, VIRGINIA.

PROCESS OF DEPOSITING CARBON IN POROUS SUBSTANCES.

1,158,965.      Specification of Letters Patent.      Patented Nov. 2, 1915.

No Drawing.      Application filed August 26, 1913. Serial No. 786,815.

*To all whom it may concern:*

Be it known that I, WALLACE APPLETON BEATTY, a citizen of the United States residing at New York, in the county of New York and State of New York, have invented certain new and useful Improvements in Processes of Depositing Carbon in Porous Substances; and I do hereby declare the following to be a full, clear, and exact description of the invention, such as will enable others skilled in the art to which it appertains to make and use the same.

This invention relates to a process of depositing carbon in the pores of wood and other porous substances, and has for its object to produce a method that will be simple, certain, expeditious and inexpensive.

To these ends the invention consists in the novel steps constituting my process as well as in the novel product resulting therefrom, all as will be more fully hereinafter disclosed and particularly pointed out in the claims.

In carrying out my invention, the substances to be treated such as wood, paper materials, cloth, leather, etc., are first preferably dried in a vacuum with or without the application of heat according to the nature of the substance, and the pores thus opened. I then immerse the dried wood or other material in a solution containing an organic substance and an acid, such for example, as sugar, glucose, or turpentine and sulfuric acid dissolved in water, alcohol or other solvent. I have found in the case of wood that the following solution produces excellent results:—Three pounds of cane sugar, dissolved in two gallons of water, and sufficient sulfuric acid added to make the mixture contain two per cent. sulfuric acid. Another mixture is:—An alcoholic solution of turpentine containing about two pounds of turpentine to a gallon of alcohol with two per cent. of sulfuric acid added. After the dried substance is thus immersed in the solution it may be subjected to pressure with or without applying heat according to the results desired. The degree of pressure of course will also depend upon the nature of the wood or other material being treated. For ordinary woods, I find from seventy-five to one hundred pounds sufficient to produce excellent results. Also the time this pressure is applied will vary with the degree of impregnation desired. I find from one to two hours produces excellent results with wood. After the impregnating material is thus forced into the pores, it is preferably dried in a vacuum in the case of wood at the temperature derived from a steam pressure of from say ten to fifteen pounds; but of course this temperature will vary with the nature of the impregnated material. This drying action of course causes the acid in the solution to liberate the carbon in the organic material and to deposit the same in an impalpable state throughout the pores penetrated. The completeness of this deposition will vary with the time of drying and also with the temperature employed, so that the operator by regulating one or both of these factors may easily control the resulting color that is imparted. The shades that may be thus produced in the case of woods vary from a gray through reddish brown, dark brown to black and jet black. And since carbon is chemically inert at ordinary temperatures, the colors thus obtained are permanent. Not only may carbon be thus deposited, but other salts may be added in small quantities to the solution, such for example, as the halogen salts of copper, iron, cobalt, etc., and the final colors thus modified at will. Again, other organic substances may be added to the impregnating material which will not be decomposed by the acid, and which will give certain specific physical properties to the impregnated material. For example, gums or varnishes may be added to the impregnating solutions in order to give the product a hard and brilliant finish. For example, to the above solution of alcohol, turpentine and sulfuric acid, I may add in the proportion of one pound of gum to one gallon of said solution, the synthetic gum described in my copending application No. 702046, filed June 6, 1912, and which is a condensation product of dioxy-diphenyl-dimethyl-methane and formaldehyde. This gum makes the product waterproof, chemically resistant to reagents, very much less inflammable than before, and it greatly increases the electrical insulating properties of the impregnated substance. It causes cheap soft woods to take on the qualities and properties of the highest grades of expensive hard woods, and when properly colored as above disclosed such soft woods closely resemble the hard woods in appearance and wear, thus making it possible to use said soft woods for floors and other places where only hard woods are now employed.

Of course, my said gum can be loaded with any desired coloring material before it is applied, and in that case, the finished product can be given the desired shade at once.

In the case of leather and some other substances, I prefer instead of the sulfuric acid to employ chromic acid, potassium dichromate, potassium permanganate zinc chlorid or other substances having dehydrating or oxidizing properties while not injuring the material to be impregnated. I am thus enabled to give leather, cloth, etc., widely different and useful physical properties, while at the same time permanently coloring them to any desired tones and shades.

By the terms a porous substance having carbon deposited in its pores in an impalpable state of subdivision found in the claims I do not intend to include a porous substance wherein the carbon is mechanically forced into the pores, but only porous substances wherein the carbon is introduced into the pores by means of a solution and deposited from said solution by chemical means. The physical distinction between the two substances is very pronounced and clear, as will be evident to those skilled in the art.

It is obvious that those skilled in the art may vary the details of my process without departing from the spirit thereof, and therefore I do not wish to be limited to the above disclosure except as may be required by the claims.

What I claim is:—

1. The process of depositing carbon in a porous substance which consists in impregnating said substance with a solution of a chemical compound containing carbon and of an acid capable of precipitating said carbon in the pores of said substance, whereby said acid may liberate said carbon after said impregnation, substantially as described.

2. The process of depositing carbon in a porous substance which consists in suitably opening the pores of said substance; and impregnating said substance with a solution of a chemical compound containing carbon and of an acid capable of precipitating said carbon in the pores of said substance, whereby said acid may liberate said carbon after said impregnation, substantially as described.

3. The process of depositing carbon in a porous substance which consists in opening the pores of said substance; impregnating said substance with a solution of a chemical compound containing carbon and of an acid capable of precipitating said carbon in the pores of said substance, whereby said acid may liberate said carbon after said impregnation and heating the substance thus impregnated to facilitate the reaction, substantially as described.

4. The process of depositing carbon in porous substances which consists in drying said substances in a vacuum to open the pores; impregnating said substances with a solution containing carbon in a chemical combination and an acid capable of precipitating said carbon; applying pressure to the substances thus impregnated; and in applying heat to the substance thus impregnated to deposit the carbon in the pores, substantially as described.

5. The process of depositing carbon in porous substances which consists in impregnating said substances with a solution containing a gum, carbon in a chemical combination and an acid capable of precipitating said carbon; and in applying heat to the substance thus impregnated to deposit the carbon in the pores, substantially as described.

6. The process of depositing carbon in porous substances which consists in drying said substances in a vacuum to open its pores; impregnating said substances with a solution containing a gum, carbon in a chemical combination and an acid capable of precipitating said carbon; and in applying heat to the substance thus impregnated to deposit the carbon in the pores, substantially as described.

7. The process of depositing carbon in porous substances which consists in drying said substances in a vacuum to open the pores; impregnating said substances with a solution containing a gum, carbon in a chemical combination and an acid capable of precipitating said carbon; applying pressure to force said solution into the pores; and applying heat in a vacuum to dry the impregnated substances and to liberate the carbon, substantially as described.

8. The process of depositing carbon in porous substances which consists in drying said substances in a vacuum to open the pores; impregnating said substances with a solution containing a gum consisting of a condensation product of dioxy-diphenyl-dimethyl-methane and formaldehyde, carbon in a chemical combination and an acid capable of precipitating said carbon; applying pressure to force said solution into the pores; and applying heat in a vacuum to dry the impregnated substances and to liberate the carbon, substantially as described.

9. The herein described product consisting of a porous substance having carbon chemically deposited in its pores in an impalpable state of subdivision, substantially as described.

10. The herein described product consisting of a porous substance having a gum and carbon chemically deposited in its pores in an impalpable state of subdivision, substantially as described.

11. The herein described product consisting of a porous substance having a gum consisting of a condensation product of dioxy-diphenyl-dimethyl-methane and carbon deposited in its pores in an impalpable state of subdivision, substantially as described.

12. The herein described product consisting of wood having carbon deposited in its pores in an impalpable state of subdivision, substantially as described.

In testimony whereof I affix my signature, in presence of two witnesses.

WALLACE APPLETON BEATTY.

Witnesses:
T. W. WITHERSPOON,
U. T. MENGERT.